United States Patent [19]

Talu

[11] Patent Number: 5,160,512
[45] Date of Patent: Nov. 3, 1992

[54] GAS SEPARATION PROCESS

[75] Inventor: Orhan Talu, Richmond Heights, Ohio

[73] Assignee: Cleveland State University, Cleveland, Ohio

[21] Appl. No.: 819,991

[22] Filed: Jan. 13, 1992

[51] Int. Cl.$^5$ .............................................. B01D 53/04
[52] U.S. Cl. ......................................... 55/28; 55/59; 55/61; 55/70; 55/74; 55/77
[58] Field of Search ............... 55/59, 61, 70, 71, 73, 55/74, 387, 77–79, 181, 390, 28; 423/230, 239, 240

[56] References Cited

U.S. PATENT DOCUMENTS

| | | | |
|---|---|---|---|
| 1,319,663 | 10/1919 | Davis et al. | 55/70 X |
| 2,098,779 | 11/1937 | Gericke et al. | 55/74 X |
| 2,823,765 | 2/1958 | Maslan | 55/74 X |
| 2,823,766 | 2/1958 | Maslan | 55/74 X |
| 2,886,131 | 5/1959 | Conlisk et al. | 55/74 X |
| 3,428,426 | 2/1969 | Carney et al. | 55/70 X |
| 3,679,369 | 7/1972 | Hashimoto et al. | 55/70 X |
| 3,710,548 | 1/1973 | Coughlin | 55/74 X |
| 3,721,066 | 3/1973 | Teller | 55/74 X |
| 3,755,989 | 9/1973 | Fornoff et al. | 55/74 X |
| 3,813,852 | 6/1974 | Steineke | 55/74 X |
| 4,049,399 | 9/1977 | Teller | 55/74 X |
| 4,072,479 | 2/1978 | Sinha et al. | 55/74 X |
| 4,072,480 | 2/1978 | Wagner | 55/74 X |
| 4,128,405 | 12/1978 | Frohreich et al. | 55/59 |
| 4,283,204 | 8/1981 | Savage | 55/61 X |
| 4,292,285 | 9/1981 | Nakao et al. | 423/210 |
| 4,303,329 | 12/1981 | Michlin | 55/70 X |
| 4,334,756 | 6/1982 | Michlin et al. | 55/70 X |
| 4,689,062 | 8/1987 | MacLean et al. | 62/18 |
| 4,855,276 | 8/1989 | Osborne et al. | 55/70 X |
| 5,013,335 | 5/1991 | Marcus | 55/70 |

FOREIGN PATENT DOCUMENTS

| | | | |
|---|---|---|---|
| 2157062 | 5/1973 | Fed. Rep. of Germany | 55/70 |
| 52-069870 | 6/1977 | Japan | 55/61 |
| 53-019174 | 2/1978 | Japan | 55/70 |
| 53-038275 | 10/1978 | Japan | 55/70 |
| 53-137071 | 11/1978 | Japan | 55/70 |
| 54-132471 | 10/1979 | Japan | 55/70 |
| 54-152659 | 12/1979 | Japan | 55/70 |
| 55-102420 | 8/1980 | Japan | 55/70 |
| 55-152523 | 11/1980 | Japan | 55/70 |
| 55-152525 | 11/1980 | Japan | 55/70 |
| 56-076223 | 6/1981 | Japan | 55/70 |
| 58-014932 | 1/1983 | Japan | 55/70 |

*Primary Examiner*—Robert Spitzer
*Attorney, Agent, or Firm*—John F. McDevitt

[57] ABSTRACT

An improved method for removal of a gas constituent from a gas stream is disclosed employing a composite sorbent material. The gas stream is passed through a bed of solid absorbent particles having a surface liquid deposit which absorbs part of the gas constituent to be removed while further enabling a remaining portion of the gas constituent to be adsorbed.

11 Claims, 2 Drawing Sheets

GAS SEPARATION PROCESS

BACKGROUND OF THE INVENTION

This invention relates generally to a method enabling improved separation of a sorbable gas constituent from a gas stream and, more particularly, to effecting such removal with a composite sorbent material providing increased sorption.

Various gas-adsorption processes have long been used to remove one or more constituents from a gas mixture. In doing so, the selection of a particular method is determined generally by the physical and chemical properties of the gas stream including concentration of the gas constituents, pressure, temperature, flow rate of the gas stream and still other factors. The desired separation is commonly effected by contacting a moving gas stream with a bed of solid adsorbent particles employing fixed or static bed operation, fluidized bed operation, moving bed operation or gas flow transfer contact wherein the powdered adsorbent particles have been dispersed in said gas stream. A known fluidized-bed type adsorption system is disclosed in U.S. Pat. No. 4,292,285 to remove compounds with an offensive odor like ammonia, benzene, diethylamine and still others from a gas mixture. A mixture of activated carbon and porous carbon impregnated with phosphoric acid or ammonium phosphate is used as the adsorbent material. It is reported that ammonia can be removed from a large amount of flowing gas even at a very low concentration. The gas stream to be treated is introduced into the adsorption chamber and odorous compounds are removed by adsorption therein. When the adsorbent material is saturated, the adsorption bed is regenerated with steam at 150°-300° C. The collected odorous gases are burned over a platinum catalyst. The regenerated adsorbent is thereupon transferred into the adsorption chamber for renewal of the adsorption-desorption cycle. In U.S. Pat. No. 4,283,204 there is disclosed a gas adsorption system to remove contaminants and impurities from a moving gas stream with a magnetically stabilized adsorption bed. Various adsorbent materials are said to be useful such as activated carbon and zeolites. Small adsorbent particles (50-1500 microns) are used to reduce the diffusional resistance during gas passage so adsorption equilibrium can quickly be reached. In order to prevent back-mixing of the solids and to reduce the pressure drop in the adsorbent bed, the adsorbent particles are mixed with a magnetizable component with an electromagnet being further employed to separate the micro fine particles in the effluent. For adsorbent regeneration, a portion of the purified gas stream is heated and used to flush the contaminants from the saturated adsorbent particles. A still further U.S. Pat. No. 4,689,062 reports separating ammonia from a synthesis plant purge gas at relatively high pressures around 1100 psig using zeolite adsorbent material in a three-bed adsorption system. Regeneration is reported to be carried out by purging the adsorption system with a hydrogen-rich gas stream at 400 psig in treating a two percent ammonia containing gas at 1200 psig.

As above indicated, the overall effectiveness of removing an undesired gas constituent from a gas mixture depends upon many factors. Factors that must be considered in carrying out an efficient and economical removal and/or recovery include capacity of the adsorbent material, selectivity of the adsorbent material with respect to all constituents in the gas stream, ease of desorbing the adsorbed constituent, desorption efficiency, and the costs involved. To further illustrate with respect to above cited adsorption processes wherein ammonia can be removed, any presence of moisture in the gas stream has now been found to reduce the adsorption capacity of certain adsorbents, such as zeolites. The affinity of zeolites and other polar-type adsorbent materials for moisture hinders the ammonia adsorption capacity so that nonpolar-type adsorbent materials such as activated carbon and activated alumina now prove more efficient. Since the attractive force between ammonia and polar-type adsorbent materials is also very strong, a relatively high desorption temperature in excess of 350° C. also proves necessary to regenerate conventional adsorbent beds. Accordingly, it remains desirable to enhance the adsorptive separation of various gaseous substances from a gas stream in a novel manner.

It is therefore an object of the present invention to provide a more effective method for removing a sorbable gas from a gas mixture both with respect to the amount of particular gas constituent being sorbed as well as improving its subsequent recovery.

It is another object of the present invention to provide a sorption method having improved sorption capacity for various sorbable gas substances.

Still another object of the present invention is to provide a continuous sorption cycle for the removal of various gas constituents or contaminants and odorants from a process or waste gas stream enabling improved recovery of the removed gas constituent further accompanied by regeneration of the particular sorbent material being employed.

It is a still further object of the present invention to provide a continuous sorption cycle for the recovery of ammonia from a process or waste gas stream which is less sensitive to ambient conditions while providing a more efficient recovery.

These and other objects as well as advantages of the present invention will become more apparent from the following detailed description being provided upon preferred embodiments.

SUMMARY OF THE INVENTION

It has now been discovered, surprisingly, that ammonia along with other adsorbable gases which can further be absorbed in a liquid are now more effectively separated from a gas mixture in a novel manner. Basically, such adsorbable and absorbable gaseous substances are removed from the gas mixture by (a) activating a bed of adsorbent particles with a liquid capable of absorbing the adsorbable gas to form a surface deposit of said liquid on the adsorbent particles, (b) contacting the activated adsorbent bed with the gas mixture as a flowing gas stream, (c) absorbing a portion of the adsorbable gas in the liquid deposit, and (d) adsorbing a further portion of the adsorbable gas in the adsorbent bed to provide increased sorption capacity during removal. Activation of the adsorbent bed in the above step (a) further causes some of the liquid medium to become adsorbed in the pores of the adsorbent particles.

A continuous adsorption cycle employing the above described process steps can be conducted with a bed of solid adsorbent particles having selective adsorptive capacity for the particular gaseous substance to be removed including both static and moving bed type operation. The presently improved process can further be conducted at varying temperature and pressure conditions found optimum for adsorption of the particular gaseous substance being removed to include such adsorption being carried out at above atmospheric pressures as well as elevated temperatures. Correspondingly, the presently improved method can be carried out in existing adsorption equipment means to include multiple beds of the adsorbent particles being operated in series and wherein the removal is conducted with a continuous passage of the moving gas stream through one or more adsorbent beds. Subsequent removal of both adsorbed and absorbed gas from the adsorbent bed means in the present method can also be carried out in a conventional manner to include steam regeneration of the adsorbent bed or heated air passage depending upon identity of the particular constituent being removed and the particular adsorbent material being employed to do so.

In a preferred embodiment, ammonia is recovered from a waste gas stream employing the process steps of (a) activating an adsorbent bed of porous carbon particles with steam to form a moisture film on the carbon particles accompanied by liquid adsorption, (b) continuously passing the gas stream through the adsorbent bed while maintaining the adsorbent bed at ambient conditions, (c) absorbing a portion of the ammonia in the liquid medium while adsorbing a further portion of the ammonia in the adsorbent particles to provide increased sorption capacity during ammonia removal from the gas stream, and (d) desorbing a portion of the adsorbed and absorbed ammonia from the adsorbent bed with steam to enable ammonia recovery as an aqueous ammonium solution accompanied by reactivation of the adsorbent bed. The ammonia removal capacity in the above illustrated embodiment was found to be as high as 3-4 times the isothermal adsorption capacity for the particular activated carbon adsorbent material being utilized. Such enhancement is believed only partially attributable to absorption in liquid water surrounding the adsorbent particles with change in the adsorption mechanism for ammonia being responsible for the remaining improvement. A further advantage realized with steam regeneration of the adsorbent bed in the illustrated embodiment is relative insensitivity of the ammonia removal capacity to relative humidity of the waste gas stream. Evidently so much liquid moisture is deposited on the adsorbent carbon particles with steam regeneration that the realized enhancement occurs even with a waste gas stream that is relatively bone dry. This is a major advantage from a process control standpoint since the separation or recovery of ammonia can thereby be based on equilibrium regardless of the inlet humidity.

DETAILED DESCRIPTION OF THE PREFERRED EMBODIMENTS

Figure 1:
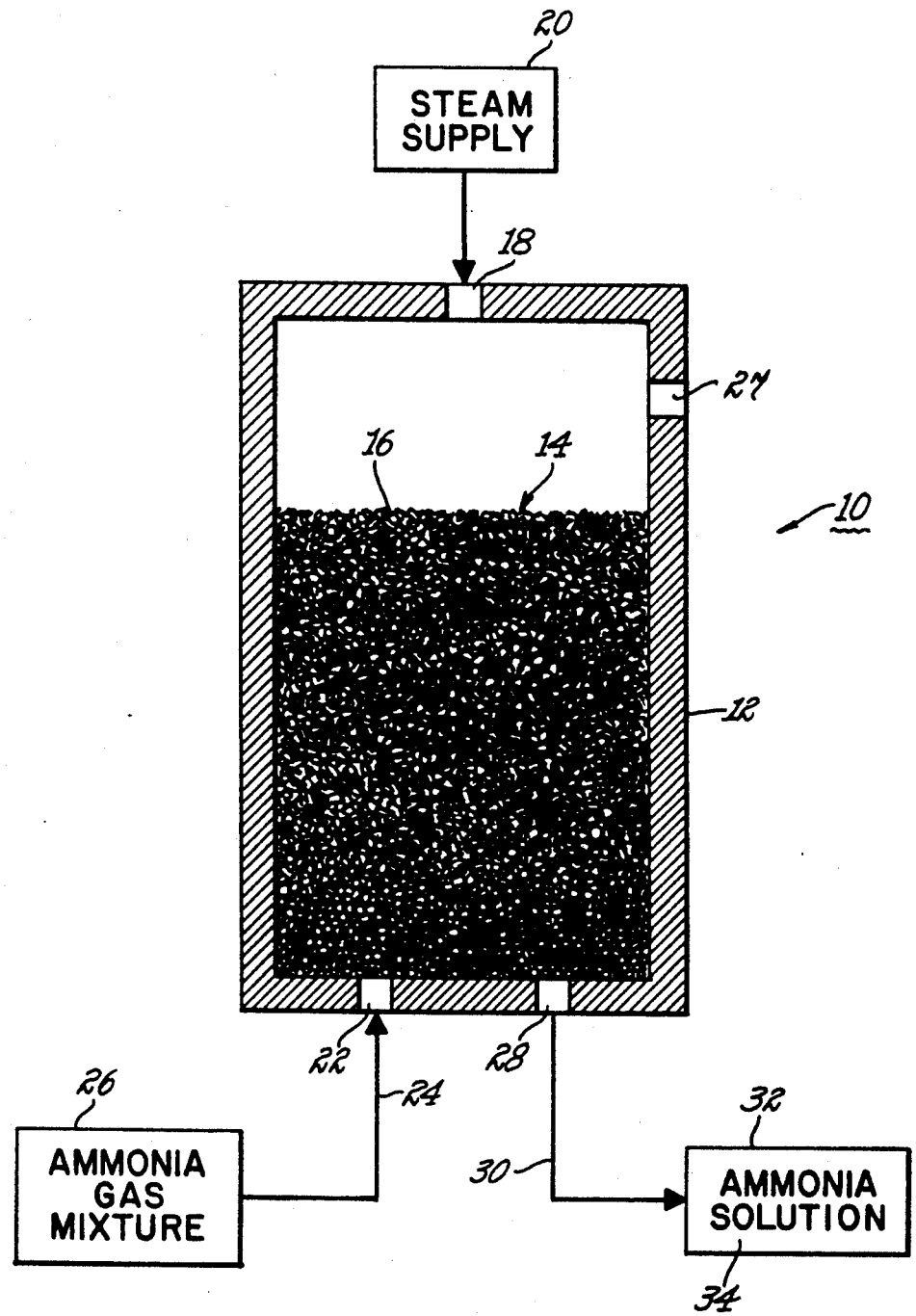
FIG. 1 is a cross sectional view for a representative apparatus embodiment which carries out the improved gas separation of the present invention for ammonia recovery from a moving gas stream.

Referring to the drawings, FIG. 1 depicts a laboratory scale adsorption apparatus 10 employed to separate ammonia gas from a process gas mixture. Said apparatus comprises an adsorption chamber 12 containing an adsorbent bed 14 of activated carbon particles 16 and which is operated in upward flow fashion with respect to conducting the present separation. A commercial grade of granular carbon adsorbent material obtained from the Sutcliffe Company was selected for evaluation with packing dimensions in the stainless steel adsorption chamber being approximately two centimeters diameter and twenty-five centimeters in length. Entrance means 18 is provided at the top end of said adsorption chamber or column to intermittently admit steam from conventional supply means 20 for both activation and regeneration of the adsorbent bed 14 when conducting the illustrated recovery process. Further entrance means 22 located at the bottom of adsorption chamber 12 continuously admits a moving stream of the ammonia containing gas mixture 24 during the recovery process which is again obtained from a conventional source of process or waste gas 26. Another opening 27 provided near the top end of adsorption chamber 12 enables an essentially ammonia-free gas stream to emerge. A second opening 28 is also provided at the bottom end of adsorption chamber 12 for emergence of an effluent condensate stream 30 which recovers the ammonia desorbed from the adsorbent bed when contacted with steam for subsequent condensation and cooling in conventional reservoir means 32 as an aqueous ammonium solution 34.

For comparative evaluation, a number of ammonia recovery cycles were performed with the above illustrated apparatus employing air streams having various ammonia concentrations between the parts per million level and several percent. The adsorbent bed was contacted with these gas mixtures at various gas stream flow rates under relatively ambient temperature and pressure conditions. In conducting the ammonia separation, steam is first admitted to the adsorption chamber for activation of the adsorbent bed with steam condensate forming as a surface deposit on the carbon particles up to approximately 0.8 gram water per gram of carbon. The gas stream is next admitted to the adsorption chamber in upward continuous flow with the effluent gas being monitored until inlet and exit ammonia concentrations matched. Water content of the effluent stream remained at approximately one hundred percent relative humidity during gas stream flow regardless of the relative humidity found in the inlet gas stream. The ammonia air mixture was found to pick up moisture from the steam-flushed adsorption chamber during ammonia removal from the gas stream by adsorption and absorption in the composite sorbent medium. The amount of water lost during the ammonia sorption step was found to be less than three percent of the total water present at the end of the steam flush demonstrating that ammonia capacity for the illustrated recovery process does not depend upon the relative humidity of the inlet gas stream. This is a significant finding promoting a relatively broad usefulness for the said process since the relative humidity of waste and process gas mixtures varies widely in most practical applications. Recovery of the sorbed ammonia from the adsorption chamber is carried out with an additional steam-flush. Steam warms the adsorbent bed causing desorption of ammonia which mixes with steam condensate emerging from the adsorption chamber. The recovery cycle is completed in such manner since the adsorbent bed has also been reactivated during the ammonia desorption step.

Results of the foregoing comparative evaluation are reported in the Table below. The ammonia concentration and relative humidity of each gas mixture employed is listed along with "bed capacity" and "sorption capacity" values derived from the individual run conditions. The latter reported values clearly demonstrate a significant increase in sorption capacity for the present recovery method with such capacity enhancement believed to be attributable in part to ammonia absorption as well as ammonia adsorption in the presence of moisture.

TABLE

| Run | Ammonia (ppm) | Humidity (% RH) | Capacity (mg/gm) Sorption | Bed | Utilization % |
|---|---|---|---|---|---|
| 1 | 840 | 41.0 | .63 | .50 | 80.5 |
| 2 | 705 | 43.0 | 1.55 | 1.15 | 74.5 |
| 3 | 834 | 43.0 | 2.06 | 1.56 | 75.7 |
| 4 | 734 | 44.0 | 1.96 | 1.38 | 70.4 |
| 5 | 1518 | 40.0 | 3.89 | 2.60 | 66.8 |
| 6 | 810 | 35.0 | 2.49 | 2.01 | 80.7 |
| 7 | 7380 | 20.0 | 11.39 | 9.95 | 87.3 |
| 8 | 7068 | 20.0 | 10.03 | 8.78 | 87.5 |
| 9 | 20000 | .0 | 29.19 | 25.86 | 88.6 |
| 10 | 4898 | 10.0 | 9.17 | 7.89 | 86.1 |
| 11 | 4658 | 28.0 | 9.22 | 7.57 | 82.1 |
| 12 | 13960 | 8.0 | 19.58 | 17.40 | 88.8 |
| 13 | 270 | 38.0 | 1.42 | 1.22 | 85.9 |

Figure 2:
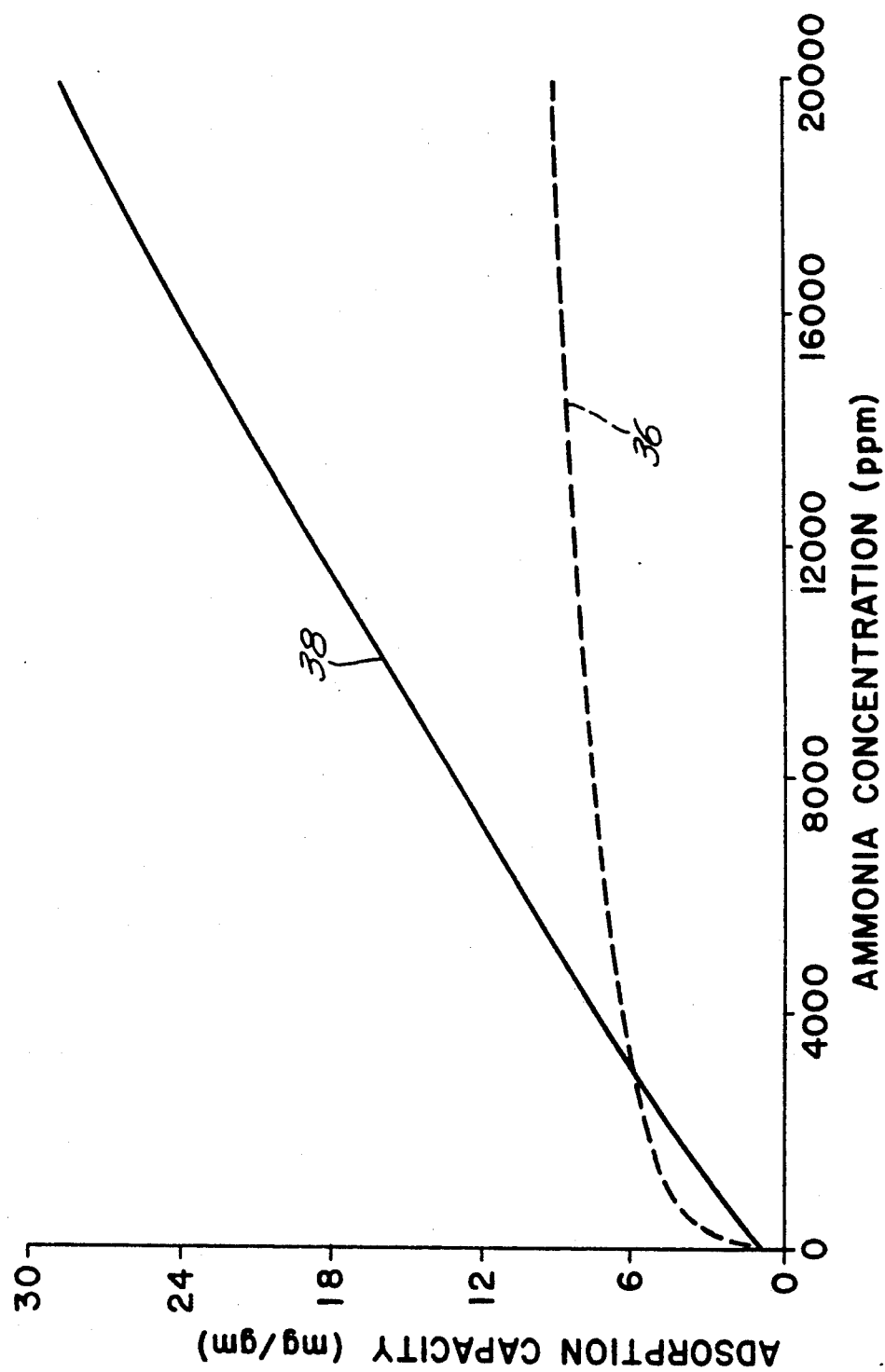
FIG. 2 is a graph depicting the enhanced sorption capacity achieved with operation of the FIG. 1 apparatus.

The foregoing ammonia capacity improvement can further be illustrated by graphical means shown in FIG. 2. Curve 36 represents the isothermal capacity for ammonia adsorption employing the illustrated adsorbent bed whereas curve 38 depicts the wet carbon ammonia capacity achieved in the above reported comparative evaluation. As therein depicted, the wet carbon ammonia capacity is higher than isothermal capacity when the ammonia concentration is above 3000 ppm with the enhancement being as high as four times at 20000 ppm ammonia concentration.

Conventionally derived bed capacity and utilization percent values are also reported in the above Table to help illustrate further contemplated variation in the illustrated recovery process. More particularly, the further reported values reflect some reduction up to about 10% for bed utilization when a single adsorption chamber is employed and renewal of the recovery cycle takes place therein upon reaching substantially equal ammonia concentrations in the inlet and effluent gas streams. While such lower bed capacity can be expected in the illustrated manner since a water film deposited on the adsorbent particles represents an added diffusional resistance during the recovery process, greater bed utilization can be realized through various process modifications. For example, conducting the present separation method for ammonia as well as other adsorbable gases with a multiple adsorbent bed unit having the individual adsorbent beds being operated in series, such as by utilizing the already known "Simulated Moving Bed" type operation, provides one means for achieving separation based upon equilibrium saturation for the particular adsorbent material being employed. In accordance with such modified separation process, a pair of adsorption chambers such as hereinabove described, can be interconnected for continuous passage of the gas stream therethrough with the inlet gas stream being switched from the first adsorption chamber to the second adsorption chamber upon reaching substantially full equilibrium saturation of the first adsorption chamber. Additional interconnection between said adsorption chambers enables the effluent stream from the first adsorption chamber to be admitted to the second adsorption chamber whereupon unsorbed gas being removed can further be sorbed therein. Additionally, still other known apparatus arrangements are contemplated in which to conduct the presently improved gas separation process depending upon the performance ability of the particular sorbent material being employed with respect to the gas being removed and the requirements of the process. Generally, two adsorption units suffice for continuous operation having a single adsorbent bed or series connected multiple adsorbent beds enabling complete removal of the adsorbable gas constituent. In such case, one adsorption unit can be operated while the remaining unit is being regenerated. For continuous operation wherein a second-stage adsorbing unit is needed for complete removal of the adsorbable gas constituent, however, a three-step operational cycle can be followed having the units again interconnected in series so that a pair of the adsorbing units operate while the remaining adsorbing unit is being regenerated.

As further above indicated, other adsorbable gases than ammonia are contemplated for removal from a gas mixture in accordance with the presently improved method. Representative gases include organic and inorganic compounds which can further be dissolved in the particular liquid solvent selected for use. Aliphatic and aromatic gaseous hydrocarbons are thereby contemplated to include methane, ethane, propane, benzene and toluene as well as substituted hydrocarbons whereas contemplated gaseous inorganic compounds include halogens and sulfides. Correspondingly, nonpolar type adsorbent materials regarded as useful in the present separation process include activated carbons, treated activated carbons, molecular-sieve carbons, nonstoichiometric carbon-sulfur compounds, graphitized carbon black and activated alumina.

It will be apparent from the foregoing description that a broadly useful and novel method has been provided to more effectively separate a sorbable gas from a gas stream. It will also be apparent that significant further modifications can be made in the particular gas constituent to be removed together with the sorbent materials selected to do so other than herein specifically illustrated, however, without departing from the true spirit and scope of the present invention. Likewise, modifications other than specifically herein illustrated can be employed to vary the operating conditions when conducting the disclosed method to include both temperature and pressure variation as well as variation in the adsorption equipment means for doing so. Consequently, it is intended to limit the present invention only by the scope of the appended claims.

What I claim as new and desire to secure by Letters Patent of the United States is:

1. A method to more effectively remove ammonia from a flowing waste gas stream comprising the steps of:

(a) activating a bed of adsorbent particles with steam to form a surface deposit of condensed steam on the adsorbent particles, (b) contacting the activated adsorbent bed with the flowing waste gas stream, (c) absorbing a portion of the ammonia in the condensed steam deposit, and (d) adsorbing a further portion of the ammonia in the adsorbent particles to provide increased sorption capacity during removal.

2. The method of claim 1 wherein the removal is conducted with a static bed of the adsorbent particles.

3. The method of claim 1 wherein the removal is conducted with a moving bed of the adsorbent particles.

4. The method of claim 1 wherein the removal is conducted at above atmospheric pressure.

5. The method of claim 1 wherein the removal is conducted at elevated temperatures.

6. The method of claim 1 wherein the removal is conducted with multiple beds of the adsorbent particles being operated in series.

7. The method of claim 1 wherein the removal is conducted with a continuous passage of the gas stream through the adsorbent bed.

8. The method of claim 1 wherein at least a portion of the absorbed and adsorbed ammonia is subsequently desorbed from the adsorbent bed.

9. The method of claim 8 wherein desorption is conducted by heating the adsorbent bed.

10. The method of claim 8 wherein desorption is conducted by contacting the adsorbent bed with a different gas stream.

11. A method to recover ammonia from a waste gas stream comprising the steps of:
  (a) activating an adsorbent bed of porous carbon particles with steam to form a moisture film on the carbon particles accompanied by liquid adsorption,
  (b) continuously passing the gas stream through the adsorbent bed at ambient conditions,
  (c) absorbing a portion of the ammonia in the liquid medium while adsorbing a further portion of the ammonia in the adsorbent particles to provide increased sorption capacity during ammonia removal from the gas stream, and
  (d) desorbing a portion of the adsorbed and absorbed ammonia from the adsorbent bed with steam to enable ammonia recovery as an aqueous ammonium solution accompanied by reactivation of the adsorbent bed.

* * * * *